US012679244B2

(12) United States Patent
Aoki et al.

(10) Patent No.: US 12,679,244 B2
(45) Date of Patent: Jul. 14, 2026

(54) ELECTRIC WORK VEHICLE

(71) Applicant: Kubota Corporation, Osaka (JP)

(72) Inventors: Keita Aoki, Sakai (JP); Kazuto Okazaki, Sakai (JP); Daiki Tamba, Sakai (JP); Shunya Takase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 83 days.

(21) Appl. No.: 18/791,599

(22) Filed: Aug. 1, 2024

(65) Prior Publication Data

US 2024/0399927 A1 Dec. 5, 2024

Related U.S. Application Data

(63) Continuation of application No. PCT/JP2022/041914, filed on Nov. 10, 2022.

(30) Foreign Application Priority Data

Feb. 3, 2022 (JP) ................................. 2022-015812

(51) Int. Cl.
*B60L 58/18* (2019.01)
*B60L 1/00* (2006.01)
*B60L 50/60* (2019.01)

(52) U.S. Cl.
CPC ................. *B60L 58/18* (2019.02); *B60L 1/00* (2013.01); *B60L 50/60* (2019.02); *B60L 2200/40* (2013.01); *B60L 2240/547* (2013.01)

(58) Field of Classification Search
None
See application file for complete search history.

(56) References Cited

U.S. PATENT DOCUMENTS

2008/0067973 A1 3/2008 Ishikawa et al.
2011/0160019 A1* 6/2011 Harada .................... B60K 6/28
180/65.265
(Continued)

FOREIGN PATENT DOCUMENTS

JP 2006050779 A 2/2006
JP 2017128186 A 7/2017
(Continued)

OTHER PUBLICATIONS

International Search Report in PCT/JP2022/041914, mailed Jan. 10, 2023, 3 pages.
(Continued)

*Primary Examiner* — Daniel L Greene
(74) *Attorney, Agent, or Firm* — Keating & Bennett, LLP

(57) ABSTRACT

An electric work vehicle includes an electric motor to drive a vehicle body to travel, a first battery chargeable by an external power supply to supply driving electric power to the electric motor, a second battery that is rechargeable to supply electric power to an electric component installed in the vehicle body, a voltage converter to supply electric power while adjusting a voltage value between the first and second batteries, and a controller to which electric power is supplied from the second battery and configured or programmed to control a charge state during charging by the power supply and to control operation of the voltage converter. The control is configured or programmed to execute an interval charging process repeatedly at set time intervals to control operation of the voltage converter to charge the second battery using electric power supplied from the first battery.

5 Claims, 6 Drawing Sheets

(56)                  References Cited

U.S. PATENT DOCUMENTS

| | | | |
|---|---|---|---|
| 2012/0123625 A1* | 5/2012 | Ueo ........................ | B60L 50/16 |
| | | | 701/22 |
| 2013/0127244 A1* | 5/2013 | Handa ............... | B60W 50/0097 |
| | | | 307/9.1 |
| 2017/0203661 A1 | 7/2017 | Nishinaka et al. | |
| 2021/0291688 A1 | 9/2021 | Hirose et al. | |
| 2022/0289073 A1 | 9/2022 | Takaki | |

FOREIGN PATENT DOCUMENTS

| | | | |
|---|---|---|---|
| JP | 2021099086 A | 7/2021 | |
| JP | 2021151030 A | 9/2021 | |

OTHER PUBLICATIONS

Written Opinion in PCT/JP2022/041914, mailed Jan. 10, 2023, 4 pages.

\* cited by examiner

ELECTRIC WORK VEHICLE

CROSS REFERENCE TO RELATED APPLICATIONS

This application claims the benefit of priority to Japanese Patent Application No. 2022-015812 filed on Feb. 3, 2022 and is a Continuation Application of PCT Application No. PCT/JP2022/041914 filed on Nov. 10, 2022. The entire contents of each application are hereby incorporated herein by reference.

BACKGROUND OF THE INVENTION

1. Field of the Invention

The present invention relates to electric work vehicles each including an electric motor to drive a vehicle body to travel and a battery to supply driving electric power to the electric motor.

2. Description of the Related Art

For example, as described in JP 2021-99086A, an electric work vehicle of this type includes, in addition to the battery (first battery) for supplying electric power to the electric motor for driving the vehicle body to travel, a low-voltage in-vehicle battery (second battery) for supplying electric power to electronic devices such as a controller configured to execute various controls. The controller executes controls such as the control of the operation of the electric motor and the control of charging of the batteries.

SUMMARY OF THE INVENTION

The first battery has a large capacity in order to drive the electric motor, but the second battery has a smaller capacity than the first battery. If the work vehicle remains unused for a long time, the second battery discharges, and the amount of charge may thus decrease significantly. With such a decrease in the amount of charge in the second battery, operating the controller may no longer be possible. Then, the first battery cannot be charged, which in turn makes it impossible to drive the electric motor and enable the work vehicle to travel.

Therefore, there is a demand for enabling that, even if the work vehicle remains unused for a long time, the battery can be charged to a state that makes it possible to drive the electric motor.

An electric work vehicle according to an example embodiment of the present invention includes an electric motor to drive a vehicle body to travel, a first battery chargeable by an external power supply to supply driving electric power to the electric motor, a second battery that is rechargeable to supply electric power to an electric component in the vehicle body, a voltage converter to supply electric power while adjusting a voltage value between the first battery and the second battery, and a controller to which electric power is supplied from the second battery and configured or programmed to control a charge state during charging by the power supply and to control operation of the voltage converter, wherein the controller is configured or programmed to execute an interval charging process repeatedly at set time intervals to control operation of the voltage converter to charge the second battery using electric power supplied from the first battery.

According to an example embodiment of the present invention, the controller is configured or programmed to execute the interval charging process each time a set time interval elapses. In other words, the controller is configured or programmed to charge the second battery using electric power supplied from the first battery. For example, even when the work vehicle shifts from a state in which it is used to a state in which it is not used, it is possible to avoid a decrease in the amount of charge in the second battery by executing the interval charging process repeatedly at the set time intervals.

Consequently, even when the work vehicle is left unused for a long time, it is possible to avoid a significant decrease in the amount of charge in the second battery and to charge the first battery using the external power supply by operating the controller.

Therefore, even if the work vehicle remains unused for a long time, the first battery can be charged to a state that makes it possible to drive the electric motor.

In an example embodiment of the present invention, it is preferable that the set time intervals are set to a length that allows a certain amount of charge to be guaranteed even if no charging occurs within any given time interval.

With this configuration, when the interval charging process is executed, a certain amount of charge is guaranteed in the second battery, and the amount of charge is prevented from decreasing to such a level that it is no longer possible to operate the controller, due to discharging.

In an example embodiment of the present invention, it is preferable that the controller is configured or programmed to control operation of the electric motor, the electric work vehicle includes a start command generator configured or programmed to switch the controller to an operable state in response to the start command generator being manually operated in a state in which a portable operation key is within a predetermined distance from the vehicle body or a state in which the operation key is secured in a securing portion, the controller is configured or programmed to switch to an inactive state in which the controller does not control operation of the electric motor, in response to the operation key being switched to a state in which the operation key is away from the vehicle body or a state in which the operation key is removed from the securing portion, and the controller is configured or programmed to execute the interval charging process even in the inactive state.

With this configuration, when the start command generator is manually operated in the state in which the operation key is close to the vehicle body or the state in which the operation key is secured in the securing portion, the controller switches to the operable state, and the work vehicle performs work and the like. Then, after completion of the work, when the operator holding the operation key moves away from the vehicle body, or the operation key is switched to the state in which it is removed from the securing portion, the controller switches to the inactive state, in which the controller does not control the operation of the electric motor.

After the controller switches to the inactive state, the work is complete and the operator is away from the vehicle body, and therefore, it is conceivable that the work vehicle may be left as-is and unused for a long time. However, since the controller is configured or programmed to execute the interval charging process even after switching to the inactive state as described above, discharge of the second battery and the resulting decrease in the amount of charge can be prevented.

In an example embodiment of the present invention, the controller is configured or programmed to operate in an electric power-saving mode in which only the interval charging process is executable, after the operation key is switched to the state in which the operation key is away from the vehicle body or the state in which the operation key is removed from the securing portion.

With this configuration, even in a state in which the work vehicle is left as-is and unused for a long time, the power consumption of the second battery can be reduced by the controller operating in the electric power-saving mode, and hence the amount of charge in the second battery can be prevented from decreasing in an early stage.

In an example embodiment of the present invention, it is preferable that the electric work vehicle includes a backup battery that is separate from the second battery and configured to supply electric power to the controller.

With this configuration, even if the amount of charge in the second battery decreases for some reason, the backup battery enables the controller to be operated to execute the interval charging process.

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a left side view showing an arrangement of an inverter and the like.

DETAILED DESCRIPTION OF THE EXAMPLE EMBODIMENTS

Figure 1:
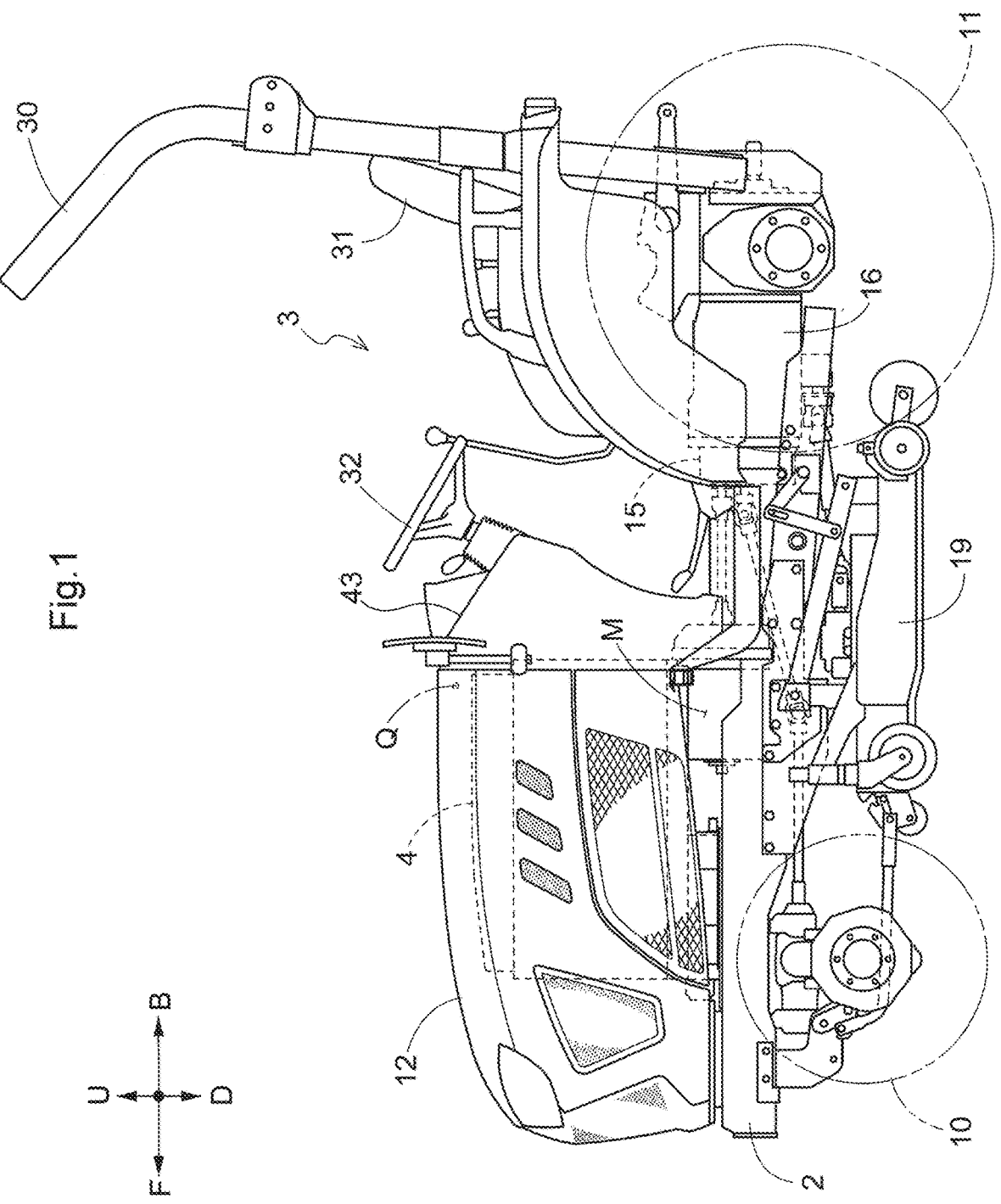
FIG. 1 is a left side view of a tractor.

Example embodiments of the present invention will be described based on the drawings. In the following description, unless otherwise stated, the direction of an arrow F and the direction of an arrow B in the drawings will be respectively referred to as "the front side" and "the rear side", and the direction of an arrow L and the direction of an arrow R in the drawings will be respectively referred to as "the left side" and "the right side". Also, the direction of an arrow U and the direction of an arrow D in the drawings will be respectively referred to as "the upper side" and "the lower side".

The following describes a tractor as an example of an electric work vehicle according to an example embodiment of the present invention. As shown in FIG. 1, the tractor includes left and right front wheels 10, left and right rear wheels 11, and a cover 12.

The tractor includes a body frame 2 and a driving section 3. The body frame 2 is supported by the left and right front wheels 10 and the left and right rear wheels 11.

The cover 12 is disposed in a front portion of the body of the tractor. The driving section 3 is behind the cover 12. In other words, the cover 12 is in front of the driving section 3.

The driving section 3 includes a protective frame 30, a driver's seat 31, and a steering wheel 32. An operator can sit in the driver's seat 31. Accordingly, the operator can get on the driving section 3. The operator steers the left and right front wheels 10 by operating the steering wheel 32. The operator can perform various driving operations in the driving section 3.

The tractor includes, as a first battery, a battery 4. The cover 12 is pivotable about an opening and closing axis Q extending in the left-right direction of the body. Accordingly, the cover 12 is openable and closable. When the cover 12 is closed, the battery 4 is covered by the cover 12.

Figure 2:
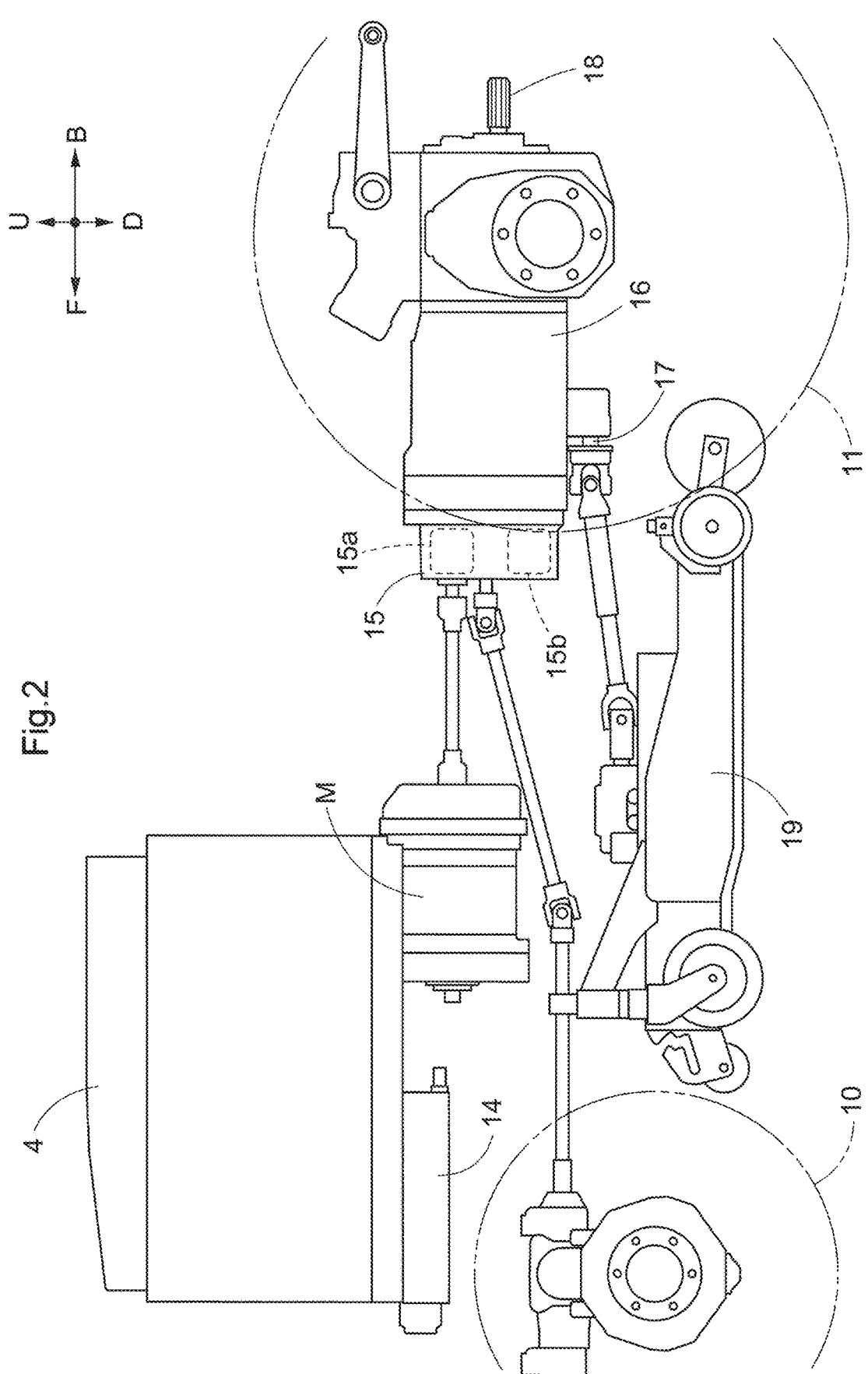

As shown in FIG. 2, the tractor includes an inverter 14 and an electric motor M. The battery 4 supplies electric power to the inverter 14. The inverter 14 converts DC power supplied from the battery 4 to AC power, and supplies the AC power to the electric motor M. The electric motor M is driven by the AC power supplied from the inverter 14.

Figure 3:
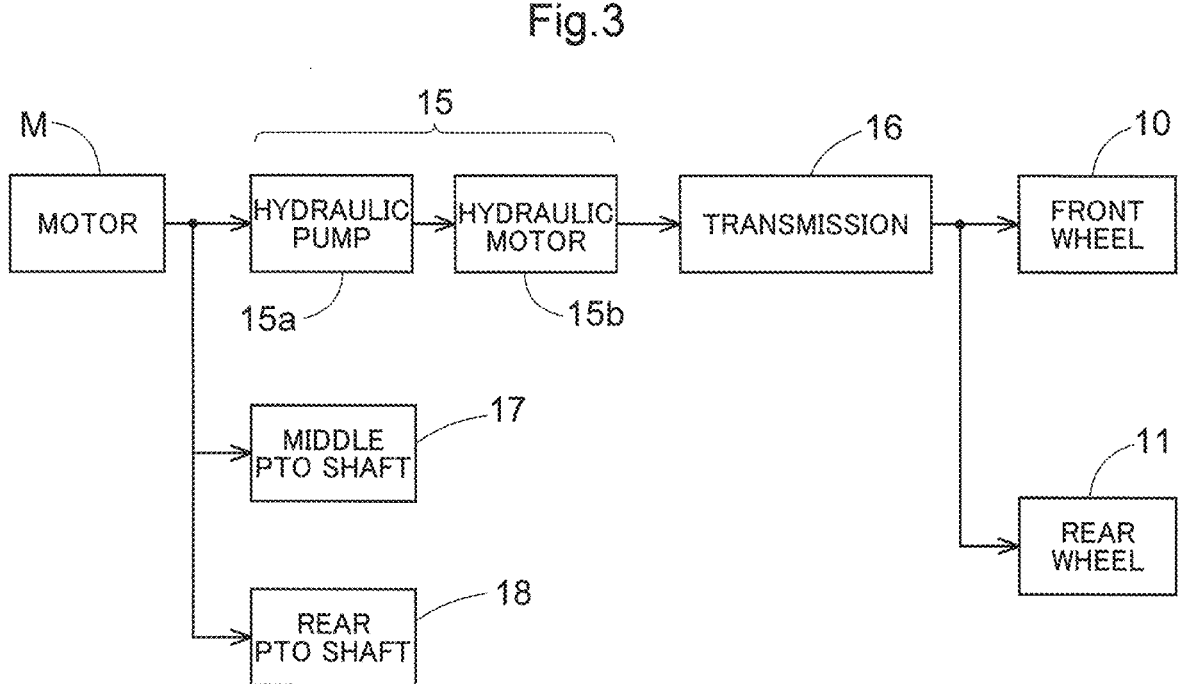
FIG. 3 is a diagram showing a flow of motive power transmission.

As shown in FIGS. 2 and 3, the tractor includes a hydraulic continuously variable transmission 15 and a transmission 16. As shown in FIG. 3, the hydraulic continuously variable transmission 15 includes a hydraulic pump 15a and a hydraulic motor 15b.

The hydraulic pump 15a is driven by rotational motive power transmitted from the electric motor M. As a result of the hydraulic pump 15a being driven, rotational motive power is output from the hydraulic motor 15b. The hydraulic continuously variable transmission 15 is configured to change the speed of rotational motive power between the hydraulic pump 15a and the hydraulic motor 15b. The hydraulic continuously variable transmission 15 is configured to be capable of changing the transmission ratio in a stepless manner.

The rotational motive power output from the hydraulic motor 15b is transmitted to the transmission 16. The speed of the rotational motive power transmitted to the transmission 16 is changed by a gear transmission mechanism included in the transmission 16, and the rotational motive power is distributed to the left and right front wheels 10 and the left and right rear wheels 11. Thus, the left and right front wheels 10 and the left and right rear wheels 11 are driven.

As shown in FIGS. 2 and 3, the tractor also includes a middle PTO shaft 17 and a rear PTO shaft 18. Rotational motive power output from the electric motor M is distributed to the hydraulic pump 15a, the middle PTO shaft 17, and the rear PTO shaft 18. The middle PTO shaft 17 and the rear PTO shaft 18 are rotated by the distributed rotational motive power.

If a work device is connected to the middle PTO shaft 17 or the rear PTO shaft 18, the work device is driven by rotational motive power transmitted by the middle PTO shaft 17 or the rear PTO shaft 18. For example, in the present example embodiment, a grass cutting device 19 is connected to the middle PTO shaft 17 as shown in FIG. 2. The grass cutting device 19 is driven by rotational motive power transmitted by the middle PTO shaft 17.

Figure 4:
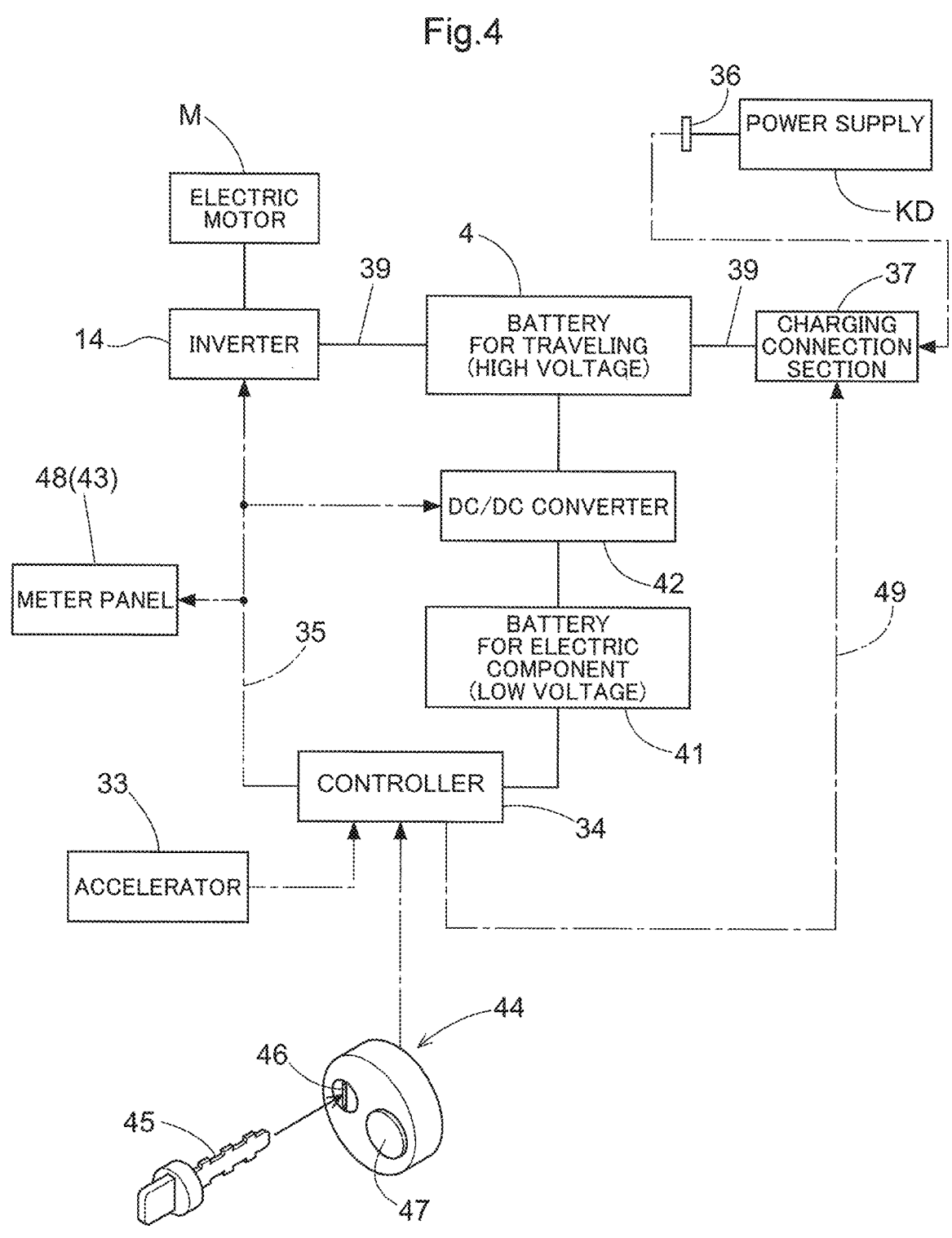
FIG. 4 is a block diagram showing a configuration for charging.

As shown in FIG. 4, a configuration related to the control of the electric motor M includes an accelerator 33, a controller 34 configured or programmed to control the operation of the electric motor M, and the inverter 14. The accelerator 33 is in the vicinity of the steering wheel 32. Although not shown, the accelerator 33 includes a pivotable lever and a potentiometer configured to be operated by pivoting the lever. The accelerator 33 is connected to the controller 34. The controller 34 is connected to the inverter 14 via a signal harness 35. The controller 34 is configured or programmed to issue a command to the inverter 14 in response to a command from the accelerator 33. The inverter 14 is configured or programmed to control the output of the electric motor M by adjusting electric power supplied to the electric motor M from the battery 4, according to the command from the controller 34.

As shown in FIG. 4, the battery 4 is chargeable by an external power supply KD. The tractor includes a charging connection section 37 to which a power supply connector 36 of the power supply KD is connectable. The charging connection section 37 is inside the cover 12 and is configured to be exposed to the outside when the cover 12 is pivoted open. The controller 34 is configured or programmed to control the operation of the electric motor M and to control the charge state during charging by the power supply KD.

The charging connection section 37 is in conformity with commonly used standard specifications. The battery 4 is charged via an electric power supply line 39 while the power supply connector 36 is connected to the charging connection section 37. The battery 4 supplies high-voltage (e.g., several tens to several hundreds of volts) electric power to the inverter 14 and the electric motor M via the electric power supply line 39.

The battery 4 uses, for example, a lithium ion battery and has a configuration in which a large number of small-sized low-voltage unit cells, which are not shown, are stacked, and the exterior of the stack is covered by and enclosed in a housing in a sealed state.

In addition to the battery 4, the tractor includes, as a second battery, a battery 41 to supply electric power to the controller 34 and other electric components. The battery 41 supplies low-voltage (12 V) electric power in order to drive the electric components. The battery 41 is charged using electric power supplied from the battery 4 via a DC/DC converter (voltage converter) 42. The DC/DC converter 42 is capable of supplying electric power while adjusting the voltage value between the battery 4 and the battery 41 for electrical components. In other words, the DC/DC converter 42 is capable of supplying electric power and charging.

The driving section 3 includes a switching operator 44 serving as a start command generator capable of switching the controller 34 between an operable state and an inactive state. The switching operator 44 includes an insertion slot 46 as a securing portion where a portable operation key 45 can be inserted and secured, and a manually-pressable push-button switch 47. The controller 34 can be switched from the inactive state to the operable state by the switch 47 being pressed while the operation key 45 is inserted and secured in the insertion slot 46. Like an ordinary key for a vehicle, the operation key 45 functions as a key that can be identified only by this specific work vehicle.

The operation panel 43 includes a meter panel 48 configured to display, for example, traveling conditions of the vehicle body, working conditions, battery information (amount of charge and temperature), and the like. The meter panel 48 is connected the controller 34, and the controller 34 controls the operation of the meter panel 48.

The controller 34, the inverter 14, the battery 4, the DC/DC converter 42, the meter panel 48, the charging connection section 37, and the like are connected via the CAN (Controller Area Network) type signal harness 35 so as to communicate data. The controller 34 communicates with the charging connection section 37 via a charging communication harness 49, and information on whether or not the power supply connector 36 is connected to the charging connection section 37, information on a charging current required by the work vehicle, and the like are transmitted therebetween. The charging connection section 37 and the power supply KD are also configured such that signals can be communicated therebetween. Furthermore, information on the operation performed on the switching operator 44 is input to the controller 34.

The controller 34 switches to a charge mode when the operation key 45 is inserted into the insertion slot 46 and secured there while the power supply connector 36 is connected to the charging connection section 37, and can then charge the battery 4 using the power supply KD.

The controller 34 switches to the operable state, in which the controller 34 can operate the electric motor M, when the switch 47 is pressed while the operation key 45 is inserted and secured in the insertion slot 46. Also, the controller 34 is configured or programmed to switch to the inactive state, in which the controller 34 does not control the operation of the electric motor M, when the operation key 45 is removed from the insertion slot 46.

The controller 34 is configured or programmed to execute an interval charging process repeatedly at set time intervals even when the controller 34 is in the inactive state to control the operation of the DC/DC converter 42 to charge the battery 41 using electric power supplied from the battery 4.

Figure 5:
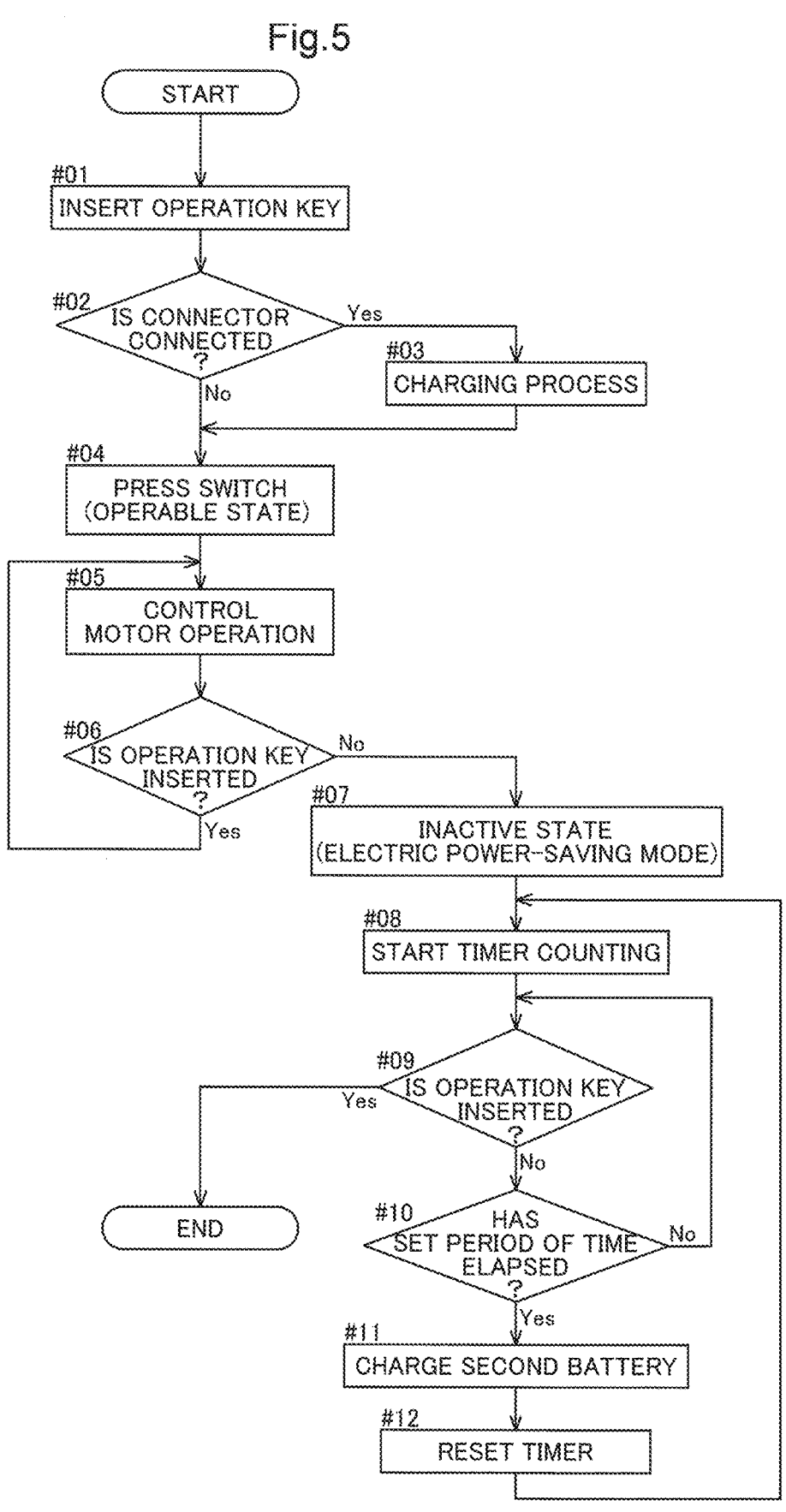
FIG. 5 is a flowchart of control operations.

Hereinafter, control performed by the controller 34 will be described with reference to the flowchart in FIG. 5.

When performing work using the work vehicle, the operator inserts and secures the operation key 45 in the insertion slot 46 of the switching operator 44 included in the operation panel 43 in the driving section 3. At this time, if the power supply connector 36 of the power supply KD is connected to the charging connection section 37, a charging process for charging the battery 1 for traveling is performed (steps #1, #2, and #3).

During the charging process, a charging operation for charging the battery 4 using the power supply KD is started by transmitting necessary information to the power supply KD via the charging communication harness 49 so as to enable the power supply KD to supply electric power. Then, the battery 4 is charged to a preset charge state, and when it is fully charged, charging is stopped.

When the switch 47 is pressed while the power supply connector 36 is not connected to the charging connection section 37, the controller 34 switches to the operable state in which it can operate the electric motor M (step #04). Then, although not described in detail, the controller 34 controls the operation of the electric motor M based on an operation command given by the operator (step #05). Note that, during the control of the operation of the electric motor M, when the switch 47 is pressed again, the operation of the electric motor M can be stopped.

After the work using the work vehicle is completed, the operator removes the operation key 45 from the insertion slot 46, and when the operation key 45 is removed, the controller 34 switches to the inactive state, in which it does not control the operation of the electric motor M (steps #06 and #07). On switching to the inactive state, the controller 34 switches to an electric power-saving mode in which only the interval charging process, which will be described later, is executable. The electric power-saving mode consumes less electric power than a normal electric power mode in which work is performed by operating the electric motor M.

After switching to the inactive state, the controller 34 executes the interval charging process repeatedly at set time intervals, the interval charging process is the process for controlling the operation of the DC/DC converter 42 to charge the battery 41 using electric power supplied from the battery 4.

More specifically, on switching to the inactive state, the controller 34 starts timer counting (step #08), and when the time counted by the timer reaches a set period of time (corresponding to each time interval of the set time intervals), the controller 34 controls the operation of the DC/DC converter 42 to charge the battery 41 using electric power supplied from the battery 4 (steps #10 and #11). When charging is completed, the controller 34 resets the timer counted value (step #12) and starts timer counting again. Then, the process from step #08 to step #12 is repeated every set period of time. The process of steps #08, #10, #11, and #12 corresponds to the interval charging process.

When the operation key 45 is inserted into the insertion slot 46 and secured there while the interval charging process is being executed, the control returns to the initial state (step #01) (step #09). At that time, the controller 34 returns from the electric power-saving mode to the normal electric power mode. After that, the charging process for charging the battery 4 or the control of the operation of the electric motor M can be performed.

The set period of time is (the set time intervals are) set to a length that allows a certain amount of charge to be guaranteed even if no charging occurs within that period of time (within any given time interval). For example, the set period of time (set time intervals) can be set to a length of about one week. In short, it is a length of time during which there is no risk of the battery 41 discharging to such a level that the amount of charge remaining in the battery becomes critically low.

By executing the above-described interval charging process, it is possible to prevent the amount of charge in the battery 41 from becoming critically low and to suitably charge the battery 4, even if the work vehicle remains unused for a long time.

OTHER EXAMPLE EMBODIMENTS (1) In the above-described example embodiments, the controller 34 is configured or programmed to execute the interval charging process and to control the operation of the electric motor M. However, instead of this configuration, a configuration may be adopted in which the electric work vehicle includes, separately from each other, a first controller configured to execute a charging process for charging the battery 4 and the battery 41, and a second controller configured or programmed to control the operation of the electric motor M, and the first controller executes the interval charging process.

(2) In the above-described example embodiments, a configuration in which the operation key 45 can be inserted and secured in the insertion slot 46 has been described. However, instead of this configuration, a configuration may be adopted in which the operation key 45 is capable of wireless communication with a receiving portion included in the body of the electric work vehicle, and when the switch 47 is operated while the operation key 45 is close to the vehicle body, the controller 34 switches to the operable state.

(3) In the above-described example embodiments, the controller 34 is configured or programmed to switch to the electric power-saving mode after the operation key 45 is removed from the insertion slot 46. However, instead of this configuration, the controller 34 may be configured or programmed to remain in the normal electric power mode even after the operation key 45 is removed from the insertion slot 46.

Figure 6:
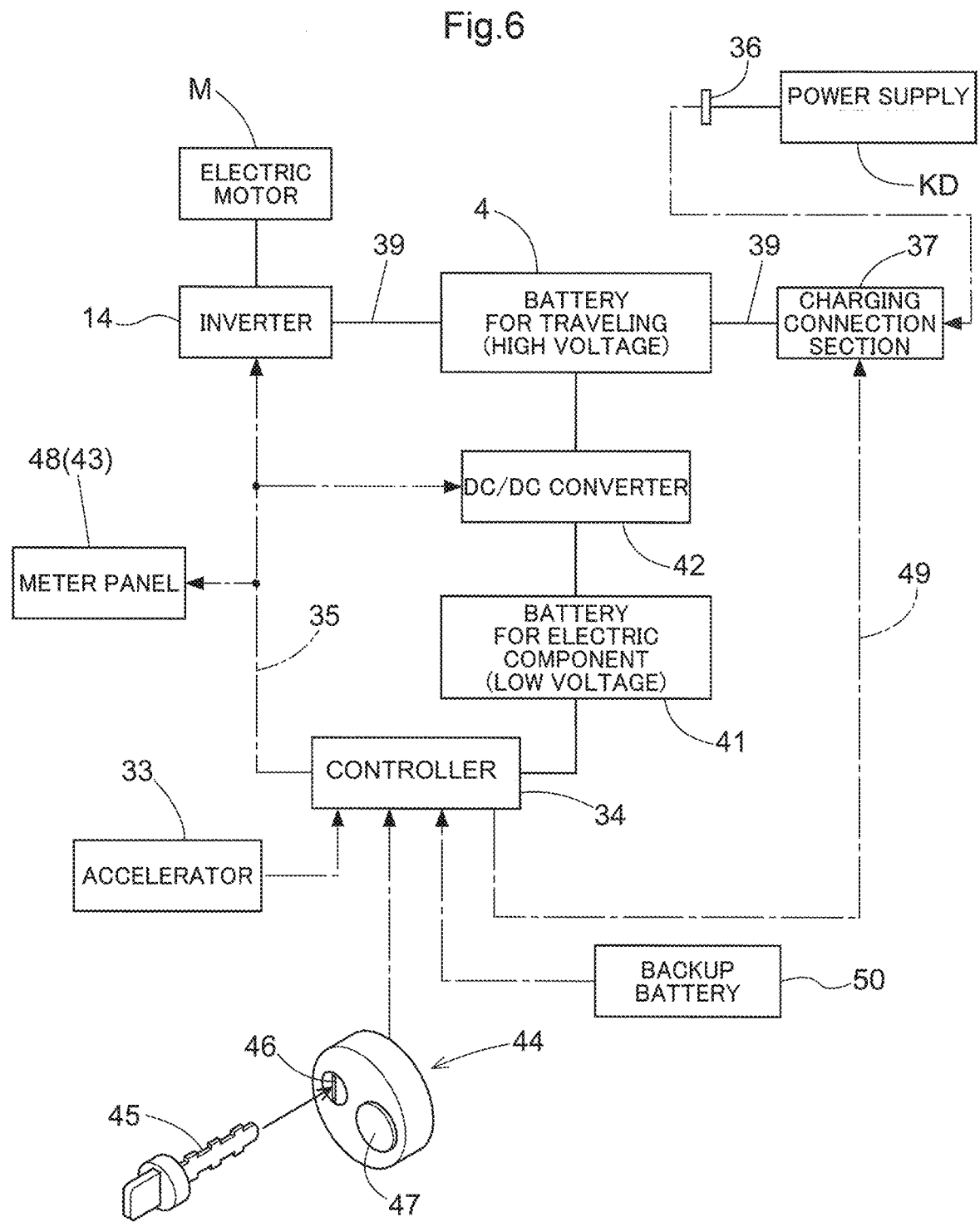
FIG. 6 is a block diagram showing a configuration for charging according to another example embodiment of the present invention.

(4) In the above-described example embodiments, a configuration has been described in which the electric work vehicle includes the battery 41 as the only battery to supply electric power to the controller 34. However, instead of this configuration, a configuration may be adopted in which, as shown in FIG. 6, the electric work vehicle includes, in addition to the battery 41, a backup battery 50 that can be used when, for example, the battery 41 fails to operate for some reason.

Example embodiments of the present invention are applicable not only to tractors but also to various electric work vehicles such as rice transplanters, combine harvesters, construction machines, and the like.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:
   an electric motor to drive a vehicle body to travel;
   a first battery chargeable by an external power supply to supply driving electric power to the electric motor;
   a second battery that is rechargeable to supply electric power to an electric component in the vehicle body;
   a voltage converter to supply electric power while adjusting a voltage value between the first battery and the second battery; and
   a controller to which electric power is supplied from the second battery and configured or programmed to control a charge state during charging by the power supply and to control operation of the voltage converter; wherein
   the controller is configured or programmed to execute an interval charging process repeatedly at fixed set time intervals to control operation of the voltage converter to charge the second battery using electric power supplied from the first battery.

2. The electric work vehicle according to claim 1, wherein the fixed set time intervals are set to a length that allows a certain amount of charge to be guaranteed even if no charging occurs within any given time interval.

3. The electric work vehicle according to claim 1, wherein
   the controller is configured or programmed to control operation of the electric motor;
   the electric work vehicle includes a start command generator configured or programmed to switch the controller to an operable state in response to the start command generator being manually operated in a state in which a portable operation key is within a predetermined distance from the vehicle body or a state in which the operation key is secured in a securing portion;
   the controller is configured or programmed to switch to an inactive state in which the controller does not control operation of the electric motor, in response to the operation key being switched to a state in which the operation key is away from the vehicle body or a state in which the operation key is removed from the securing portion; and
   the controller is configured or programmed to execute the interval charging process even in the inactive state.

4. The electric work vehicle according to claim 3, wherein the controller is configured or programmed to operate in an electric power-saving mode in which only the interval charging process is executable, after the operation key is switched to the state in which the operation key is away from the vehicle body or the state in which the operation key is removed from the securing portion.

5. The electric work vehicle according to claim 1, further comprising:

a backup battery that is separate from the second battery and configured to supply electric power to the controller.

\* \* \* \* \*